Aug. 25, 1970   C. C. HILL   3,525,213
GAS TURBINE ENGINE WITH AERODYNAMIC TORQUE CONVERTER DRIVE
Filed June 6, 1968   3 Sheets-Sheet 1

INVENTOR.
CHARLES C. HILL
BY
*[signature]*
ATTORNEYS

Aug. 25, 1970   C. C. HILL   3,525,213
GAS TURBINE ENGINE WITH AERODYNAMIC TORQUE CONVERTER DRIVE
Filed June 6, 1968   3 Sheets-Sheet 2

INVENTOR.
CHARLES C. HILL
BY
*Barnes, Kisselle, Raisch & Choate*
ATTORNEYS

United States Patent Office 3,525,213
Patented Aug. 25, 1970

3,525,213
GAS TURBINE ENGINE WITH AERODYNAMIC TORQUE CONVERTER DRIVE
Charles C. Hill, 105 Enterprise Drive,
Ann Arbor, Mich. 48103
Filed June 6, 1968, Ser. No. 734,951
Int. Cl. F16d 33/00
U.S. Cl. 60—12                             23 Claims

ABSTRACT OF THE DISCLOSURE

A gas turbine engine comprising a combustor, a turbine rotor and a stator, a compressor having a rotor and a stator and a torque converter. The torque converter has a casing filled with compressible fluid and includes a stator, an input rotor and an output rotor. The input rotor of the torque converter is connected to and driven by the rotor of the turbine. A first fluid line extends between the outlet of the compressor and the interior of the casing of the torque converter and a second fluid line extends between the inlet of the gas turbine and the casing of the torque converter. The first fluid line is connected in a manner such that the fluid flows into the casing of the torque converter at the areas of low pressure which are associated with the blades forming the stator. The casing includes an annular wall that directs some of the fluid toward the suction sides of the stator blades and another portion of the fluid toward the outlet which is connected to the second fluid line.

---

This invention relates to gas turbines and particularly to the transmission of power from gas turbines to perform work.

In my Pat. 3,314,232, issued Apr. 18, 1967, there is disclosed and claimed a gas turbine engine with aerodynamic torque converter drive which comprises a compressor, a gas turbine having a combustor, a rotor and a stator, and a torque converter. The torque converter has a casing filled with a compressible fluid, a stator, an input rotor, and an output rotor which is driven by fluid action upon rotation of said input rotor. The input rotor of the torque converter is connected to and driven by said rotor of said turbine. A first fluid line extends between the outlet of said compressor and the interior of said casing of said torque converter. A second fluid line extends between the inlet to said gas turbine and said casing.

Among the objects of this invention are to provide such a system which will operate more efficiently; and wherein the fluid is more efficiently introduced into the torque converter and removed from the torque converter.

Figure 4:
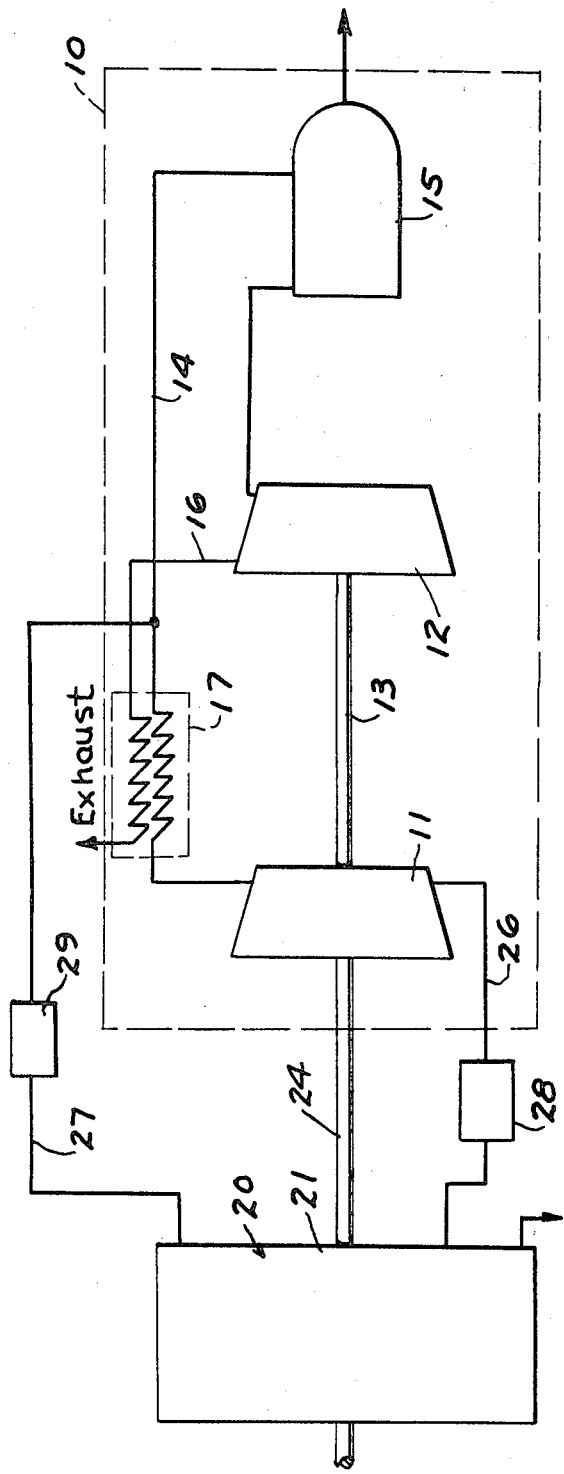
FIG. 4 is a diagrammatic view of a system embodying the invention.

Referring to FIG. 4, a conventional turbine 10 which includes a compressor 11 and a turbine 12 having their rotors connected by a single shaft 13. A portion of the output of the compressor 11 in the form of compressed air flows through a fluid line 14 to a combustor 15 of the gas turbine 10. The exhaust gases from the turbine 12 flow through line 16 to the atmosphere. Preferably the lines 14, 16 are in heat exchange relationship as at 17.

Figure 1:
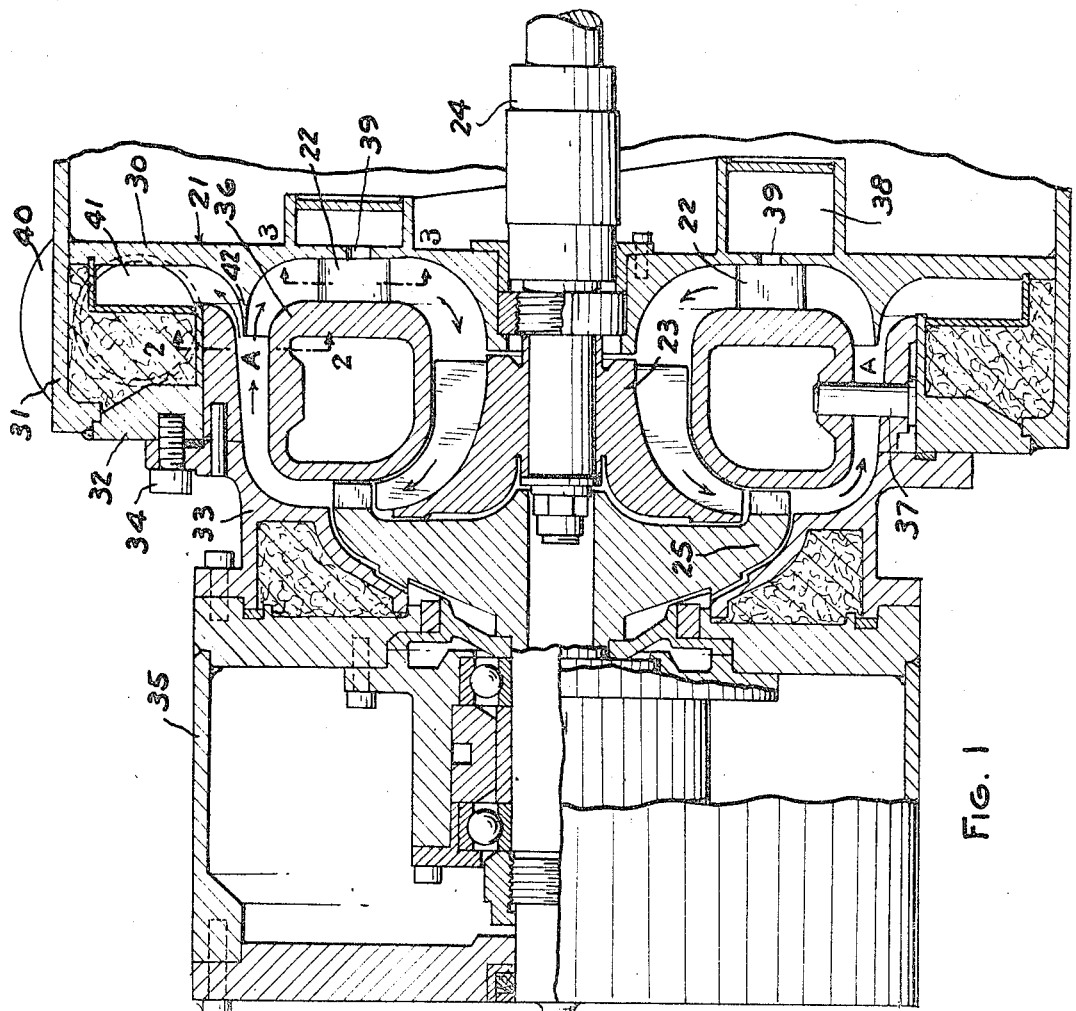
FIG. 1 is a longitudinal sectional view of a torque converter embodying the invention.
Figure 2:
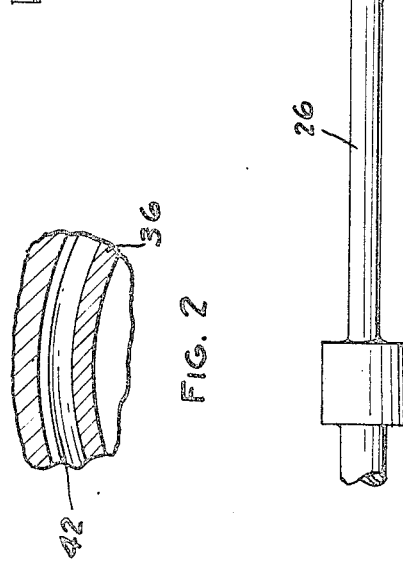
FIG. 2 is a fragmentary sectional view taken along the line 2—2 in FIG. 1.

In accordance with the invention, an aerodynamic torque converter 20 is mechanically connected to the output of the gas turbine. As shown in FIG. 1, aerodynamic torque converter 20 has a casing 21 with fixed stator blades or vanes 22 and an input rotor 23 that is connected by a shaft 24 to the shaft 13. The casing 21 is adapted to be filled with compressible fluid, namely, air, from the compressor so that upon rotation of the rotor 23, the flow of air exerts a torque which is provided to rotate an output rotor 25, the flow of air being in the path of the arrows within casing 21. Output rotor 25 may be part of a single or multi stage turbine. Torque converter 20 is preferably of the outward radial flow turbine type. As shown in the drawing, torque converter 20 comprises a single stage of compression and expansion but the torque converter may have multiple stages of compression and/or expansion. Axial flow construction may also be used.

As shown in FIG. 4, compressible fluid in the form of compressed air may flow from compressor 11 to casing 21 through a first fluid line 26. In order to control the density of the fluid in the casing 21 and to provide for a steady through flow for cooling, a second fluid line 27 extends from the casing 21 to the combustor line 14 at the outlet of the heat exchanger 17. Specifically, the first fluid line 26 is connected to the casing 21 adjacent the stator vanes 22 and second fluid line 27 is connected to the casing 21. Valves 28, 29 are provided in the fluid lines 26, 27 for control, as more clearly described in the aforementioned Pat. 3,314,232.

As shown in FIG. 1, the casing 21 comprises a generally radially extending wall 30, a cylindrical outer wall 31 welded to wall 30, and a second radial wall 32 welded to the wall 31. The casing further includes a section 33 fastened to wall 32 by bolts 34 and an end housing 35. The stator vanes 22 are mounted on a support 36 which is supported by radial pins 37 within casing 21. By the arrangement shown, fluid flows in the direction of the arrows within the casing 21.

Figure 6:
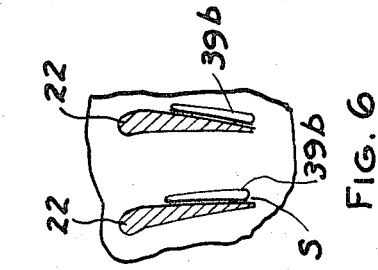
FIG. 6 is a view similar to FIG. 5 showing a further modified form of the invention.
Figure 5:
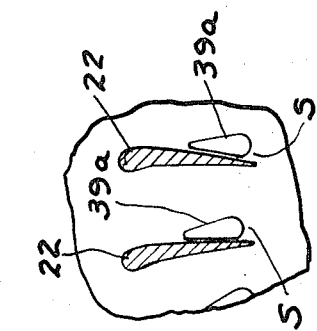
FIG. 5 is a view similar to FIG. 3 showing a modified form of the invention.
Figure 3:
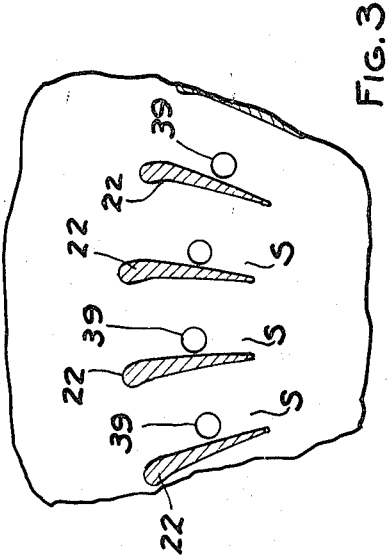
FIG. 3 is a fragmentary sectional view on an enlarged scale taken along the line 3—3 in FIG. 1.

Referring to FIG. 3, each of the stator blades 22 has an air foil cross section in accordance with conventional air foil design and includes a low pressure or suction side S. Line 26 to the casing 21 extends to a tangential inlet defined by an annular scroll or header 38. The cross section of the header 38 decreases in the direction of fluid flow. The wall 30 of the casing has axially extending openings 39 providing communication from the header 38 so that fluid will flow axially inwardly spanwise at the low pressure area of each stator blade 22. As shown in FIG. 3, the openings 39 are round in shape, but they may have other configurations. For example, as shown in FIG. 5, the openings 39a are generally triangular. In FIG. 6, the openings 39b are in the form of elongated slits.

As shown in FIG. 1, the connection of line 27 to the casing 21 is at a tangential outlet 40 that communicates with an annular chamber 41. The wall 21 includes an integral annular axially extending portion 42 that tapers to a fine edge extending axially. This tends to divide the fluid flowing from the area A so that a portion is directed toward the stator blades 22 and another portion is directed into the chamber 41. The spacing is such that the major portion of the fluid is directed toward the stator blades 22.

Figure 7:
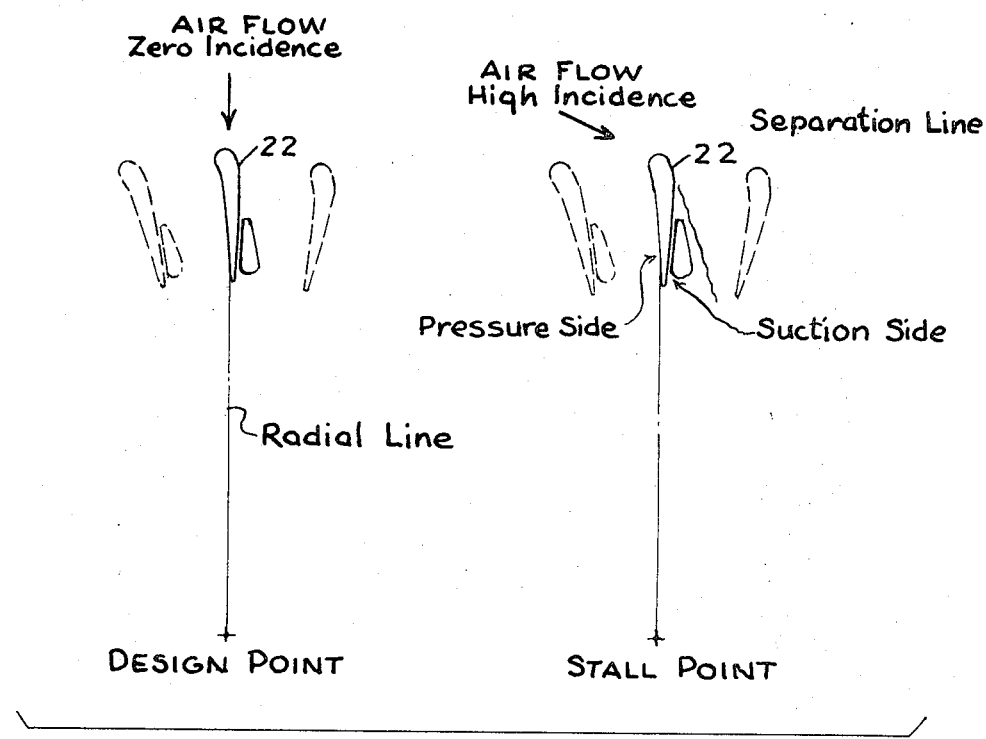
FIG. 7 are diagrammatic views showing the operation of a portion of the invention under different conditions.
Figure 8:
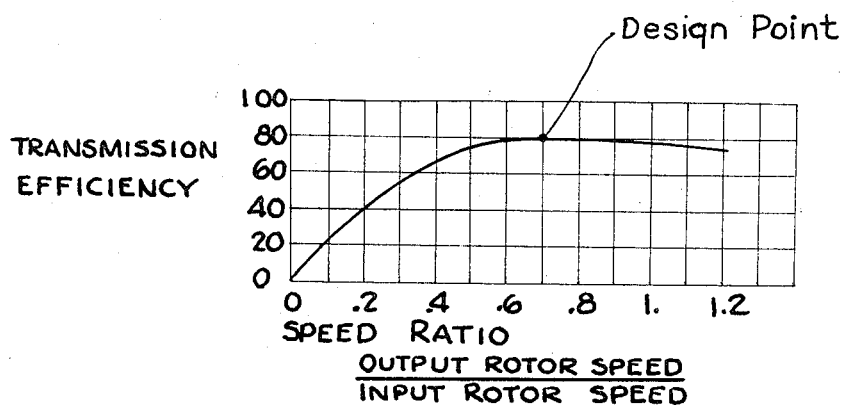
FIG. 8 is a graph of transmission efficiency versus speed ratio.

The problem to which the applicant's invention is directed may be more readily understood by reference to FIGS. 7 and 8. As shown on the left in FIG. 7, at the design point for which the torque converter is designed, the flow exiting from the output rotor has no whirl and its absolute velocity is in a straight radial direction with respect to the stator blade 22. There is therefore no whirl for the stator blades to remove and the flow approaches the stator vanes in a straight radial direction. The flow incidence angle is at or nearly at zero. Accordingly, there is no torque reaction on the stator blades. As shown on the right in FIG. 7, at stall point, that is where the ratio of output rotor speed to input rotor speed is zero, there is a large amount of exit whirl leaving the output rotor since the output rotor speed is zero and the flow leaves approximately at the blade angle which is quite large relative to a radial line. This large exit whirl continues to the inlet of the stator blade. Since the stator blades were originally arranged to present the essentially zero incidence angle at the design point, they are now, at the stall point, subjected to a large flow incidence angle and the flow tends to separate on the low pressure or suction side S of the stator blade as shown in FIG. 7. Under this condition, the stator blades have a high lift or reaction. The relationship of efficiency to speed ratio is shown in FIG. 8.

In accordance with the invention, the introduction of fluid at the low pressure or suction areas results in supplanting the fluid at the stall point and preserving blade left. During normal design point operation, the admission of fluid to the suction areas through openings 39 has little or no effect on the flow conditions around the stator blade. However, at the stall point where the incidence angle is very large and a large separated region would be expected on the suction side of the stator blade, the introduction of fluid through openings 39 into the separated or low pressure areas will increase the lift resulting in an increased torque at the stall point.

The function of the annular wall in operation not only divides the flow between outlet and the stator blades but, in addition, since it is increasing in cross sectional area, converts the velocity head of the whirling mass of air to pressure head and thereby introduces a self pumping action that facilitates flow of the fluid out of the converter.

I claim:
1. The combination comprising
a compressor,
a gas turbine having a combustor, a rotor and a stator, and a torque converter,
said torque converter having a casing filled with a fluid, a stator, an input rotor, and an output rotor which is driven by fluid action upon rotation of said input rotor,
said input rotor of said torque converter being connected to and driven by said rotor of said turbine,
a first fluid line between the outlet of said compressor and the interior of said casing of said torque converter,
a second fluid line between the inlet to said gas turbine and said casing,
said stator comprising a plurality of blades each having foil section including a low pressure area,
said casing having a plurality of fluid inlets at said low pressure areas and an outlet,
said first fluid line being connected to the casing of the torque converter in a manner such that the fluid flows from the compressor into said casing at said low pressure areas,
said casing having an annular chamber adjacent the outlet which is connected to said second fluid line,
an annular deflector extending generally axially and being adapted to direct a portion of the fluid into said annular chamber and another portion of the fluid toward said stator blade.

2. The combination set forth in claim 1 wherein said inlet to said casing directs fluid generally axially of said stator blades.

3. The combination set forth in claim 2 including a header associated with said fluid inlets, said first line being connected to said header.

4. The combination set forth in claim 3 wherein said header comprises an annular scroll of progressively decreasing cross section in the direction of flow.

5. The combination set forth in claim 3 wherein said inlet from said first line is directed generally tangentially into said header.

6. The combination set forth in claim 1 wherein said annular wall includes a tapering edge within said housing in advance of said outlet for directing a portion of the fluid toward said outlet and a portion of said fluid toward said stator blades.

7. The combination set forth in claim 6 wherein said wall is positioned such that the greatest percentage of fluid is directed toward said stator blades.

8. The combination comprising
a compressor,
a gas turbine having a combustor, a rotor and a stator, and a torque converter,
said torque converter having a casing filled with a fluid, a stator, an input rotor, and an output rotor which is driven by fluid action upon rotation of said input rotor,
said input rotor of said torque converter being connected to and driven by said rotor of said turbine,
a first fluid line between the outlet of said compressor and the interior of said casing of said torque converter,
a second fluid line between the inlet to said gas turbine and said casing,
said stator comprising a plurality of blades each having foil section including a low pressure area,
said casing having a plurality of fluid inlets at said low pressure areas,
said first fluid line being connected to the casing of the torque converter in a manner such that the fluid flows from the compressor into said casing at said low pressure areas.

9. The combination set forth in claim 8 wherein said inlets to said casing direct fluid generally axially of said stator blades.

10. The combination set forth in claim 9 including a header associated with said fluid inlets, said first line being connected to said header.

11. The combination set forth in claim 10 wherein said header comprises an annular scroll of progressively decreasing cross section in the direction of flow.

12. The combination set forth in claim 10 wherein said inlet from said first line is directed generally tangentially into said header.

13. The combination comprising
a compressor,
a gas turbine having a combustor, a rotor and a stator, and a torque converter,
said torque converter having a casing filled with a fluid, a stator, an input rotor, and an output rotor which is driven by fluid action upon rotation of said input rotor,
said input rotor of said torque converter being connected to and driven by said rotor of said turbine,
a first fluid line between the outlet of said compressor and the interior of said casing of said torque converter,
a second fluid line between the inlet to said gas turbine and said casing,
said casing having an outlet and an annular chamber adjacent the outlet which is connected to said second fluid line,
an annular deflector extending generally axially and being adapted to direct a portion of the fluid into said annular chamber and another portion of the fluid toward said stator blade.

14. The combination set forth in claim 13 wherein said annular wall includes a tapering edge within said housing in advance of said outlet for directing a portion of the fluid toward said outlet and a portion of said fluid toward said stator blades.

15. The combination set forth in claim 14 wherein said wall is positioned such that the greatest percentage of fluid is directed toward said stator blades.

16. A torque converter comprising
   a casing adapted to be filled with a compressible fluid, a stator, an input rotor, and an output rotor which is driven by fluid action upon rotation of said input rotor,
   said input rotor of said torque converter adapted to be connected to and driven by the rotor of a gas turbine,
   said casing having an inlet and an outlet,
   said stator comprising a plurality of blades each having foil section including a low pressure area,
   said inlet to said casing being located in a manner such that the compressible fluid flows from a source into said casing at said low pressure areas.

17. The combination set forth in claim 16 wherein said inlet to said casing directs fluid generally axially of said stator blades.

18. The combination set forth in claim 17 including a header associated with said fluid inlets.

19. The combination set forth in claim 18 wherein said header comprises an annular scroll of progressively decreasing cross section in the direction of flow.

20. The combination set forth in claimm 18 wherein said inlet is directed generally tangentially into said header.

21. The combination set forth in claim 16 wherein said casing has an annular chamber adjacent the outlet, an annular deflector extending generally axially and being adapted to direct a portion of the fluid into said annular chamber and another portion of the fluid toward said stator blades.

22. The combination set forth in claim 21 wherein said annular wall includes a tapering edge within said housing in advance of said outlet for directing a portion of the fluid toward said outlet and a portion of said fluid toward said stator blades.

23. The combination set forth in claim 22 wherein said wall is positioned such that the greatest percentage of fluid is directed toward said stator blades.

References Cited
UNITED STATES PATENTS

| | | | |
|---|---|---|---|
| 2,603,984 | 7/1952 | Swift | 60—54 |
| 2,717,673 | 9/1955 | Zeidler | 60—54 |
| 2,841,959 | 8/1958 | Snow | 60—54 |
| 3,164,961 | 1/1965 | Schroder | 60—54 |
| 3,165,894 | 1/1965 | Nelden | 60—54 |
| 3,314,232 | 4/1967 | Hill | 60—39.24 |
| 3,394,618 | 7/1968 | Dhonau | 60—54 |
| 3,407,600 | 10/1968 | Meyer | 60—54 |

CARLTON R. CROYLE, Primary Examiner

D. HART, Assistant Examiner

U.S. Cl. X.R.
60—39.24, 54, 57